United States Patent [19]
Olshansky

[11] 4,222,631
[45] Sep. 16, 1980

[54] MULTICOMPONENT OPTICAL WAVEGUIDE HAVING INDEX GRADIENT

[75] Inventor: Robert Olshansky, Addison, N.Y.

[73] Assignee: Corning Glass Works, Corning, N.Y.

[21] Appl. No.: 883,214

[22] Filed: Mar. 3, 1978

[51] Int. Cl.³ .............................................. G02B 5/14
[52] U.S. Cl. ................................................. 350/96.31
[58] Field of Search ......................... 350/96.30, 96.31

[56] References Cited
U.S. PATENT DOCUMENTS

| | | | |
|---|---|---|---|
| 3,904,268 | 9/1975 | Keck et al. | 350/96.30 |
| 4,025,156 | 5/1977 | Gloge et al. | 350/96.31 |
| 4,033,667 | 7/1977 | Fleming, Jr. | 350/96.31 |
| 4,057,320 | 11/1977 | Marcatilli | 350/96.31 |
| 4,111,525 | 9/1978 | Kaminow | 350/96.31 |

OTHER PUBLICATIONS

D. Gloge et al., "Multimode Theory of Graded-Core Fibers," Bell Sys. Tech. Journal, vol. 52, No. 9, Nov. 1973, pp. 1563-1578.

I. P. Kaminow, "Profile Synthesis in Multicomponent Glass Optical Fibers," Applied Optics, vol. 16, No. 1, Jan. 1977, pp. 108-112.

*Primary Examiner*—Stewart J. Levy
*Attorney, Agent, or Firm*—Walter S. Zebrowski; William J. Simmons, Jr.; Richard E. Kurtz

[57] ABSTRACT

An optical waveguide for a communication system includes a graded index core formed from at least three glass-forming compounds with a profile having at least two α-type index profile terms.

The core has a refractive index which is $n_c$ at the center of the core and which varies as a function of the radial distance r from the center of the core subststantially as:

$$n^2(r) = n_c^2 [1 - \sum_{i=1}^{N} 2\Delta_i (r/a)^{\alpha_i}]$$

where $\alpha_i$ is defined by:

$$\alpha_i = 2 - \frac{2n_c}{N_c} \frac{\lambda}{\Delta_i} \frac{d\Delta_i}{d\lambda} - \frac{12}{5} \Delta \quad i = 1 \ldots N$$

where
$N \geq 2$,
$\Delta = (n_c^2 - n_0^2)/2n_c^2$,
$n_o$ is the refractive index of said compounds at $r=a$,
$N_c = n_c - \lambda dn_c/d\lambda$ where $\lambda$ is the wavelength of the light source, and the quantities $\Delta_i$ are parameters which can be varied provided the condition $$\Delta = \sum_{i=1}^{N} \Delta_i$$

is satisfied.

11 Claims, 7 Drawing Figures

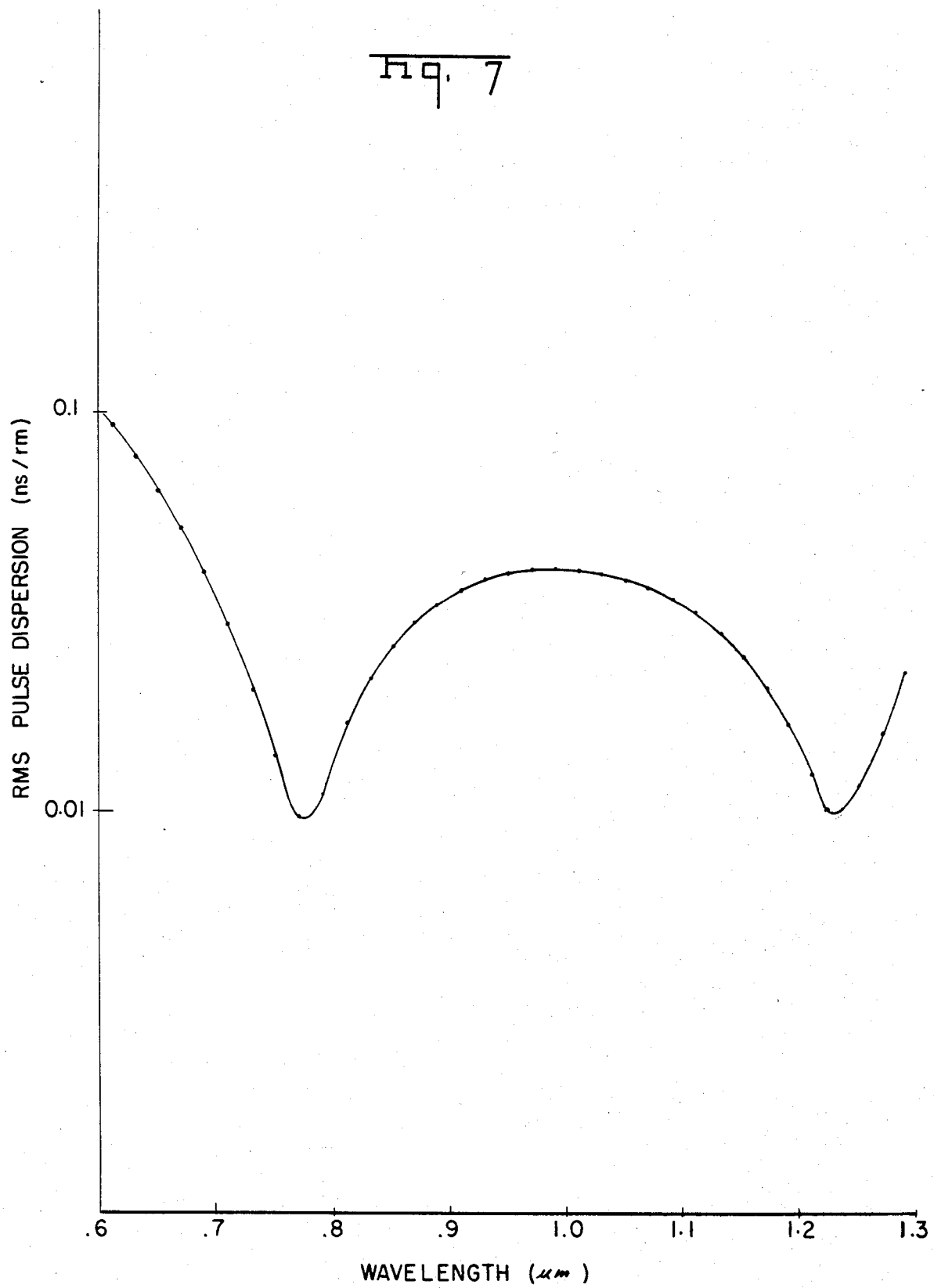

MULTICOMPONENT OPTICAL WAVEGUIDE HAVING INDEX GRADIENT

BACKGROUND OF THE INVENTION

This invention relates to multimode optical waveguides having an optimum index gradient and to methods of making them.

The propagation of light waves in optical waveguides is governed by laws of physics similar to those that govern microwave propagation and therefore can be studied in terms of modes, each of which has its own propagation and electromagnetic field characteristics. Single mode waveguides are advantageous in that they are capable of propagating optical signals with very low dispersion, but due to the low numerical aperture and/or small core size of such fibers, it is difficult to efficiently inject optical signals into these waveguides. Multimode waveguides have larger core diameters and/or larger numerical apertures than single mode waveguides. Multimode waveguides are therefore often the preferred medium for the transmission of optical signals since they can efficiently accept light from injection lasers and incoherent, broad spectral width sources such as light emitting diodes. However, thousands of modes propagate in multimode optical waveguides, each mode traveling at a slightly different group velocity. A short input pulse that is shared by many guided modes thus splits up into a sequence of pulses that arrive at the output end of the waveguide at different times. This type of pulse dispersion is the dominant cause of disperson in typical multimode optical waveguides.

Optical waveguides initially consisted of a core of uniform refractive index surrounded by a layer of cladding material having a lower refractive index. In this type of prior art fiber, the time required for the various modes to travel a given longitudinal distance along the waveguide increases as the mode order increases. The delay distortion in such a fiber, defined as the difference in the times it takes the fastest mode and the slowest mode to traverse a given longitudinal length, is very large. Optical waveguides having cores with radially graded index profiles exhibit significantly reduced pulse dispersion resulting from group velocity differences among modes. This dispersion reducing effect, which is discussed in the publication by D. Gloge et al, entitled "Multimode Theory of Graded-Core Fibers," published in the November 1973 issue of the Bell System Technical Journal, pp. 1563–1578, employs a radially graded, continuous index profile from a maximum value at the center of the core to a lower value at the core-cladding interface. The index distribution in this type of waveguide is given by the equation $$n(r) = n_c[1 - 2\Delta(r/a)^\alpha]^{\frac{1}{2}} \text{ for } r \leq a$$

where $n_c$ is the refractive index at the center of the core, $n_0$ is the refractive index of the fiber core at radius a, $\Delta = (n_c^2 - n_0^2)/2n_c^2$ and a is the core radius.

It was initially thought that the parabolic profile wherein $\alpha$ is equal to 2 would provide an index gradient that would minimize dispersion caused by group velocity differences among the modes.

The aforementioned Gloge et al publication describes a further development wherein a reduction in pulse dispersion is said to be obtained if, instead of $\alpha$ being equal to 2, it is equal to $2 - 2\Delta$. However, the theory concerning index gradients wherein $\alpha$ is equal to 2 or $2 - 2\Delta$ neglects effects introduced by differences between the dispersive properties of the core and cladding compositions.

U.S. Pat. No. 3,904,268—Keck and Olshansky describes a gradient index optical waveguide wherein the dispersive properties of the core and cladding are reduced. This patent teaches that the gradient index optical waveguide with minimal delay differences among the modes has an index profile given by $$n^2(r) = n_c^2[1 - 2\Delta(r/a)^\alpha] \ r \leq a$$

where $$\alpha \cong 2 - \frac{2n_c}{N_c} \frac{\lambda_0 d\Delta/d\lambda_0}{\Delta} - \frac{12\Delta}{5}$$

$n_c$ is the refractive index at the center of the core, $n_0$ is the refractive index of the core at $r = a$, $\Delta = (n_c^2 - n_0^2)/2n_c^2$ and $N_c = n_c - \lambda_0 dn_c/d\lambda_0$.

The invention of U.S. Pat. No. 3,904,268 is valid regardless of the glass composition provided the core refractive index is well described by the foregoing over the spectral range over which the source operates. The technique of the patent is applicable for all binary or multicomponent glass-forming compounds.

In accordance with the present invention, an additional class of graded index optical waveguides is described which are superior to the optical waveguides of U.S. Pat. No. 3,904,268 in their information carrying capacity.

The wavelength dependence of pulse dispersion of optical waveguides is an important consideration. A waveguide which provides low pulse dispersion at several different wavelengths or over a range of wavelengths is superior to one which provides low dispersion at or near a single wavelength. In the invention of U.S. Pat. No. 3,904,268, in general, the waveguide has minimal dispersion at or near a single wavelength. By choosing the profile shape of the waveguide according to Keck-Olshansky, minimal dispersion can be obtained at any chosen wavelength. However, as shown in FIG. (4) of this application, at other wavelengths, the dispersion is significantly greater.

The article "Profile Synthesis in Multicomponent Glass Optical Fibers" by Kaminow and Presby, Applied Optics 16 January 1977 and U.S. Pat. No. 4,025,156 of Gloge Kaminow and Presby show that by proper choice of glass composition, an optical waveguide can be synthesized with dispersion minimized either over a range of wavelengths or at two or more distinct distinct wavelengths.

U.S. Pat. No. 4,033,667, Fleming is related to the teachings of Kaminow, Presby and Gloge in teaching how a particular composition can have a uniform index profile over a range of wavelengths.

As is clear from the examples cited in the Kaminow-Presby article, the Gloge, Kaminow and-Presby patent, and the Fleming patent, their inventions apply to only certain limited compositions. FIG. 1 in the Kaminow-Presby paper shows that the $P_2O_5$ concentration at $r = o$ must be 11.5 times greater than the $GeO_2$ concentration at $r = a$ in order to achieve reduced pulse dispersion over an extended range of wavelengths. Although favorable from the viewpoint of dispersion, this composition is undersirable from the viewpoint of viscosity, thermal expansion, chemical durability and numerical aperture.

The same restrictions on composition are imposed by the teachings of Gloge and Presby. In their example, they find that the concentration of $GeO_2$ at $r=o$ must be eight times less than the concentration of $B_2O_3$ at $r=a$. This restriction on composition makes it impossible to design an optical fiber with other important properties such as high numerical aperture, good thermal expansion and viscosity matches across the diameter of the fiber.

The present invention avoids the severe restrictions on composition which is required to practice the Gloge-Presby patent. As will be shown, a preferred embodiment of this invention is a graded index optical waveguide, having low dispersion over a range of wavelengths or at two or more different wavelengths, and fabricated from a broad range of possible compositions.

As an example of the usefulness of the present invention, consider the fact that installing communication cables is very expensive. The cost of optical waveguides is quite small compared to this installation cost. The installed cables may have state of the art waveguides which have minimum pulse dispersion at the wavelength of sources which are presently being used, typically about 0.85 $\mu$. In the future, sources may be developed which are more efficient at other wavelengths. It would be very desirable to use waveguides in cables presently being installed which will be capable of operating for a range of wavelengths. In this manner, the cost of future installation of cables with waveguides capable of operating at a different wavelength could be avoided.

SUMMARY OF THE INVENTION

In accordance with this invention, an optical waveguide is fabricated from a plurality of glass-forming compounds with an index profile having at least two index profile terms. The concentrations of these compounds are varied so that the index of refraction is $n_c$ at the center of the core and varies as a function of the radial distance from the center of the core substantially as:

$$n^2(r) = n_c^2 [1 - \sum_{i=1}^{N} 2\Delta_i(r/a)^{\alpha_i}]$$

where $\alpha_i$ are index profiles defined by:

$$\alpha_i = 2 - \frac{2n_c}{N_c} \frac{\lambda}{\Delta_i} \frac{d\Delta_i}{d\lambda} - \frac{12}{5} \Delta \quad i = 1 \ldots N$$

where

N is greater than or equal to 2,
$n_c$ is the refractive index at the center of the core,
$n_0$ is the refractive index of said compounds at the cladding $r=a$,
$N_c = n_c - \lambda dn_c/d\lambda$, and
$\Delta = (n_c^2 - n_0^2)/2n_c^2$ The quantities $\Delta_i$ are parameters which can be varied according to other requirements provided the condition $$\Delta = \sum_{i=1}^{N} \Delta_i$$

is satisfied.

According to another aspect of this invention, the quantities $\Delta_i$ can be chosen so that minimized pulse dispersion is obtained over a range of wavelengths or at several different wavelengths.

The foregoing and other objects, features and advantages of the invention will be better understood from the following more detailed description and appended claims.

DESCRIPTION OF THE DRAWINGS

FIG. 7 shows the curve C3 depicting pulse dispersion versus wavelength for a preferred embodiment of this invention; Low pulse dispersion is achieved at two separate wavelengths.

DESCRIPTION OF THE PREFERRED EMBODIMENT

A waveguide 11 has a core 12 and a cladding 13. The index of refraction of the cladding 13 is less than that of the core 12. The core 12 has a gradient index of refraction which varies from $n_c$ at the center of the core to $n_0$ at the radius a. In accordance with the present invention the gradient is formed from at least two index profile terms which minimize pulse dispersion over a range of wavelength or at selected wavelengths.

Figure 1:
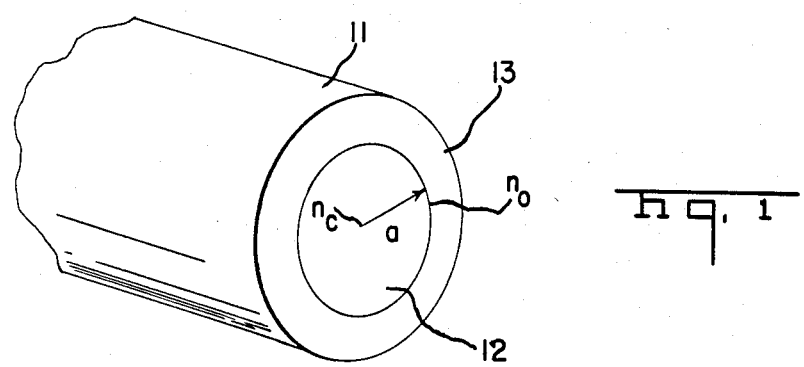
FIG. 1 shows a segment of the waveguide of this invention.
Figure 2:
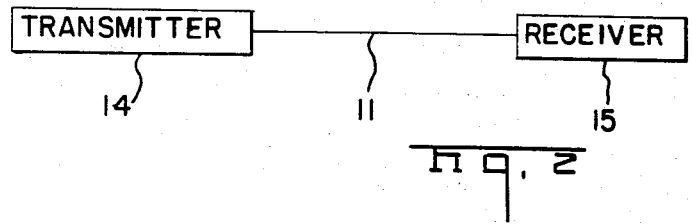
FIG. 2 depicts its use in an optical communications system.

This waveguide is coupled into an optical communication system depicted in FIG. 2 wherein a transmitter 14 includes a source producing pulses of light having a mean wavelength $\lambda$. A receiver 15 at the output end of the waveguide receives light from the waveguide 11 and responds to this light. It is desirable to minimize pulse dispersion between the transmitter 14 and the receiver 14. Further, it is desirable to minimize dispersion over a range of wavelengths or at different wavelengths.

In accordance with this invention, the core 11 is made from multicomponent glass, such as germania silicate and borosilicate glass. Each of these binary compounds has a concentration which varies radially in accordance with a different concentration profile.

Using the example of these compounds, $n_c$ denotes the refractive index of the germania silicate glass at $r=0$ and $n_0$ denotes the refractive index of the borosilicate glass at $r=a$.

In accordance with this invention, pulse dispersion in waveguides fabricated from such multicomponent glass is minimized if the refractive index of the core varies as a function of the radial distance from the center of the core in accordance with:

$$n^2(r) = n_c^2[1 - \sum_{i=1}^{N} 2\Delta_i (r/a)^{\alpha_i}] \quad (1)$$

where $\alpha_i$ are index profiles defined by:

$$\alpha_i = 2 - \frac{2n_c}{N_c} \frac{\lambda}{\Delta_i} \frac{d\Delta_i}{d\lambda} - \frac{12}{5} \Delta \quad i = 1,\ldots N \text{ where } N \geq 2 \quad (2)$$

and $N_c = n_c - \lambda dn_c/d\lambda$ $\Delta = (n_c^2 - n_o^2)/2n_c^2$ and $\Delta = \sum_{i=1}^{N} \Delta_i$.

Values of $n_c$, $dn_c/d\lambda$, $n_o$, $\Delta_i$ and $dn_o/d\lambda$, which are needed to produce a waveguide having such index profiles can be obtained by performing a Sellmeier fit to refractive index measurements taken at different wavelengths for glass compositions used as core and cladding materials.

Some techniques for measuring refractive index profiles of optical waveguides are disclosed in the publications: "Viewing Refractive-Index Profiles and Small-Scale Inhomogeneities in Glass Optical Fibers: Some Techniques" by C. A. Burrus et al., Applied Optics, Oct. 1974, Vol. 13, No. 10, pp. 2365-2369 and "Refractive Index Profile Measurements of Diffused Optical Waveguides" by W. E. Martin, Applied Optics, September, 1974, Vol. 13. No. 9, pp. 2112-2116 and in paper No. 3.5 entitled "Interferometric Measurement of SELFOC Dielectric Constant Coefficients to Sixth Order" by E. G. Rawson et al., 1973, IEEE/OSA Conference on Laser Engineering and Applications, May 30-June 1, 1973, a brief description of which may be found on pp. 22-23 of the Digest of Technical Papers presented at this conference.

Theory

The theoretical analysis showing that pulse dispersion is minimized is based on the analysis of Marcatili in Bell Systems Technical Journal 56, 49 (1977). Consider the class of index profiles $$n^2(r) = n_c^2 [1 - F(r)] \quad r \leq a \quad (3)$$

$$F(r) = \sum_{i=1}^{N} 2\Delta_i (r/a)^{\alpha_i} \quad r \leq a \quad (4)$$

where N is a positive integer. Marcatili shows that the delay time of mode $\mu,\nu$ is given by $$\tau_{\mu\nu} = T(1 - B_{\mu\nu}/D)/(1 - B_{\mu\nu})^{\frac{1}{2}} \quad (5)$$

where $$T = LN_c/C \quad (6)$$

$$N_c = n_c - \lambda dn_c/d\lambda \quad (7)$$

$$D = (1 + \frac{r}{2F} \frac{\partial F}{\partial r})/(1 - \frac{1}{2} \frac{n_c}{N_c} \frac{\lambda \partial F}{F \partial \lambda}) \quad (8)$$

$$B_{\mu\nu} = (k^2 n_c^2 - \beta_{\mu\nu}^2)/(k^2 n_c^2) \quad (9)$$

where $k=2\pi/\lambda$, L is the fiber length, and C is the speed of light. Since $B_{\mu\nu}$ is a small quantity of order $$\Delta = \sum_{i=1}^{N} \Delta_i,$$

to order $\Delta^2$, $$\tau_{\mu\nu} = T[1 - B_{\mu\nu}/D + B_{\mu\nu}/2 + (1 - \frac{1}{2D}) B_{\mu\nu}^2] \quad (10)$$

If $D=2-6/5\Delta$, the root mean square of the delay differences among the modes is minimized for $N=1$ and is equally reduced for $N \geq 2$.

Eq. (8) can be written as a partial differential equation, $$r \frac{\partial F}{\partial r} + \frac{Dn_c}{N_c} \lambda \frac{\partial F}{\partial \lambda} + 2(1 - D)F = 0. \quad (11)$$

For the class of profiles described in U.S. Pat. No. 3,904,268, $N=1$, and this equation has the solution $$\alpha = 2 - \frac{2n_c}{N_c} \frac{\lambda}{\Delta} \frac{d\Delta}{d\lambda} - \frac{12}{5} \Delta. \quad (12)$$

For profiles given by the more general expression, Eqs. (3)-(4), I have found that new solutions to Eq. (11) exist if $$\alpha_i = 2 - \frac{2n_c}{N_c} \frac{\lambda}{\Delta_i} \frac{d\Delta_i}{d\lambda} - \frac{12}{5} \Delta \quad i = 1,\ldots N. \quad (13)$$

Thus multicomponent glass optical fibers can have their pulse dispersion minimized also by the profile of Eqs. (1)-(2).

In the foregoing analysis, note that the term $$\frac{\Delta(4 + y)(3 + y)}{(5 + 2y)}$$

given in the Keck and Olshansky patent has been simplified to $-5^{12}\Delta$. That is, it has been assumed that $|y|<1$ which is a valid assumption for most cases.

The desirable condition of minimum dispersion over a range of wavelengths can be obtained for the optimum index profile of this invention. This imposes the condition that:

$$\left.\frac{d\alpha_i}{d\lambda}\right|_{\lambda=\lambda_o} = 0 \text{ for } i = 1,\ldots N. \quad (14)$$

If the $\alpha_i$ have zero derivative, the minimum pulse dispersion is obtained over a broader band of wavelengths.

An alternative condition, which is desirable for certain applications, is that minimum dispersion be obtained at two (or more) different wavelengths.

$$\alpha_i(\lambda_1) = \alpha_i(\lambda_2) \quad i=1 \ldots N. \quad (15)$$

EXAMPLE 1

As a first example consider a multimode optical waveguide consisting of a fused silica core doped at the center with 7.9 mole % $GeO_2$ and doped at $r=a$ with 13.5 mole % $B_2O_3$. Measurements of the refractive indices of the germania-silica glasses can be found in the paper by S. Kobayashi, S. Shibata, N. Shibata, T. Izawa appearing in the digest of the 1977 International Conference on Integrated Optics and Optical Fiber Communications held in Tokyo, Japan. The refractive indices of the borosilica glass can be found in the paper by J. W. Fleming appearing in the Journal of the American Ceramic Society 59, 503–507 (1976).

The refractive index data referred to above was measured on bulk samples of glass. The refractive index of an optical waveguide fiber can be substantially different from the refractive index of a bulk sample because of well known quenching effects which occur during the fiber draw. All refractive indices referred to in this application relate to the actual refractive index of an optical fiber. The refractive index data based on bulk sample measurements is used solely for the purpose of illustrating the practice of this invention.

From the appropriate Sellmeier fits it can be found that for a wavelength $\lambda$ of 0.85 $\mu$m, $n_c$ is equal to 1.46493, $n_o$ is equal to 1.45071, and $\Delta$ is equal to 0.00966.

Figure 4:
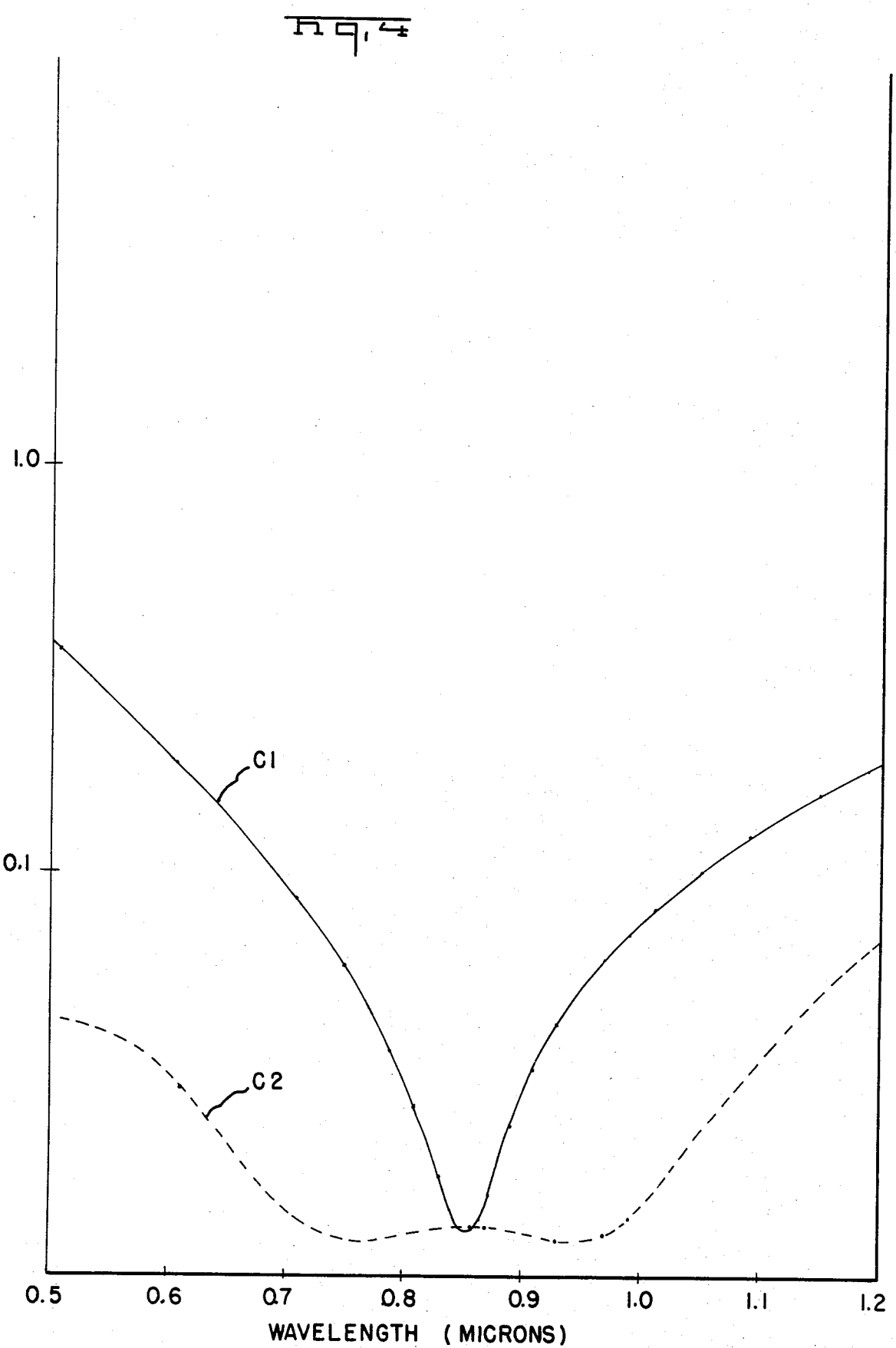
FIG. 4 shows the curve C1 depicting pulse dispersion versus wavelength for a conventional refractive index profile and the curve C2 depicting the improved pulse dispersion versus wavelength for a preferred embodiment of this invention.

Using the prior art single profile of U.S. Pat. No. 3,904,268 to minimize pulse dispersion at 0.85 $\mu$m, the $\alpha$-value is equal 1.957. The root mean square pulse broadening in nanoseconds/kilometer (ns/km) for this waveguide is shown by C1 as a function of $\lambda$ in FIG. 4. A minimum pulse dispersion of 0.013 ns/km is achieved at 0.85 $\mu$m.

In one possible embodiment of this invention, $\Delta_1$ and $\Delta_2$ are chosen such that $$\Delta_1 = (n_c^2 - n_s^2)/2n_c^2$$

$$\Delta_2 = (n_s^2 - n_o^2)/2n_c^2$$

where $n_s$ is the refractive index of fused silica. $n_s$ can be calculated from the Sellmeier fit reported by I. H. Malitson in the Journal of the Optical Society of America, 55, 1205 (1965). At 0.85 $\mu$m, $n_s$ is equal to 1.45250. For this example $\Delta_1$ is equal to 0.00845 and $\Delta_2$ is equal to 0.00121. Again using Sellmeier fits we obtain the values:

$$\lambda \frac{dn_c}{d\lambda} = -.01397;$$

$$\lambda \frac{d\Delta_1}{d\lambda} = -.423 \times 10^{-3}, \text{ and}$$

$$\lambda \frac{d\Delta_2}{d\lambda} = +.522 \times 10^{-3}$$

Using these values in equation (1), we obtain values of $\beta_1 = 2.076$ and $\alpha_2 = 1.121$ which approximately minimizes pulse dispersion at 0.85 $\mu$m.

After the optimal values of $\alpha_i$ are determined, the refractive index gradient of the core is specified by equation (1). An optical waveguide satisfying equation (1) can then be formed in accordance with one of the methods disclosed in U.S. Pat. Nos. 3,823,995 Carpenter and 3,826,560 Schultz, for example.

In general, where the refractive index varies linearly with dopant concentration, the concentration profiles $C_j(r)$ of p glass forming compounds vary substantially as:

$$C_j(r) = C_{j0} + \sum_{i=1}^{N} C_{ji}(r/a)^{\alpha_i}$$
$$j = 1, \ldots p$$
$$i = 1, \ldots N$$
$$p \geq 3 \quad N \geq 2$$

where the coefficients $C_{ij}$ and the $\alpha_j$ are chosen to give reduced pulse dispersion according to the consideration discussed herein, and where the concentrations are expressed as either mole fractions, weight fractions, atomic fraction or any other measure of concentration.

Regardless of the method of fabrication, it is improbable that a graded index optical waveguide, wherein $\alpha$ is precisely equal to a predetermined value, can be formed. However, it is possible to fabricate waveguides wherein the index profile approximates the optimal profile defined by equations (1) and (2) and yet achieve a significant reduction in pulse dispersion. These techniques are adapted to the fabrication of multicomponent glass waveguides in the manner depicted in FIG. 3 which will subsequently be described.

In the following examples 2 and 3, it is shown how preferred embodiments of the invention, represented by either Eq. (14) or Eq. (15) can be implemented. For simplicity it is assumed in these examples that the number of terms in Eq. (1) is equal to 2.

In these examples, we define two quantities which respectively represent the change in refractive index of fused silica caused by the introduction of germania and the change caused by the introduction of boron oxide. These two quantities are:

$$\delta_G = n_c^2 - n_s^2 \quad (16a)$$

$$\delta_B = n_s^2 - n_o^2 \quad (16b)$$

where $n_s$ is the refractive index of fused silica. These two quantities $\delta_G$ and $\delta_B$ are related to quantities corresponding with $\Delta_1$ and $\Delta_2$ in the preceding example. We define two further terms:

$$\delta_i' = \lambda \frac{d\delta_i}{d\lambda} \quad i = G, B \quad (17a)$$

$$\delta_i'' = \lambda \frac{d\delta_i'}{d\lambda} \quad i = G, B. \quad (17b)$$

The refractive index of fused silica, $n_s$, can be calculated from the Sellmeier fit determined by I. H. Malitson, J. Opt. Soc. Amer. 55, 1205 (1965). In this example $n_c$ is again taken to be the refractive index of silica doped with 7.9 mole percent $GeO_2$, and $n_o$ the refractive index of silica doped with 13.5 mole percent $B_2O_3$. Define the further quantities:

$$Z = \frac{\lambda}{n_c^2} \frac{dn_c^2}{d\lambda} \quad (18)$$

$$W = \frac{\lambda}{n_c^2} \frac{d}{d\lambda} \left( \lambda \frac{dn_c^2}{d\lambda} \right) \quad (19)$$

$$V = (Z^2 - W)/(2 - Z). \quad (20)$$

To divide the effect of the two dopants between $\Delta_1$ and $\Delta_2$, one can define $\Delta_1$ and $\Delta_2$ by $$\Delta_1 = [\delta_G(1 - X_G) + \delta_B X_B]/(2n_c^2) \quad (21a)$$

$$\Delta_2 = [\delta_G X_G + (1 - X_B)\delta_B]/(2n_c^2) \quad (21b)$$

$X_G$ is a measure of the amount of germania which is assigned to $\Delta_2$. If $X_G$ is 1, all of the germania is assigned to $\Delta_2$. $X_B$ is a measure of the amount of boron oxide assigned to $\Delta_1$. Equations (21a-b) are consistent with the required condition $$\Delta = (\Delta_1 + \Delta_2). \quad (22)$$

In equations (21a-b), the quantities $X_G$ and $X_B$ are introduced to specify $\Delta_1$ and $\Delta_2$. In many glass systems the square of the refractive index is proportional to dopant concentration. If this is the case then $X_G$ and $X_B$ are proportional to the dopant concentrations of $GeO_2$ and $B_2O_3$. This proportionality, however, is not necessary for the practice of this invention.

By using equations (16)–(21) it will now be shown that one can find $X_G$ and $X_B$ such that either of the preferred embodiments represented respectively by equation (14) or equation (15) is specified.

EXAMPLE 2

Consider an example in which the index profiles are given by equations (1–2), the $\Delta_i$'s are given by equations (16) and (21), and the desirable condition producing minimum dispersion over a range of wavelengths, equation (14), is met. This is equivalent to the condition:

$$(1-X_G)^2 A_{GG} + (1-X_G)X_B A_{BG} + X_B^2 A_{BB} = 0 \quad (23a)$$

$$(1-X_B)^2 A_{BB} + (1-X_B)X_G A_{BG} + X_G^2 A_{GG} = 0 \quad (23b)$$

In the foregoing, the A's are coefficients determined by the refractive indices of the glasses with which we are working. Equations (23a) and (23b) can be expressed by the more general form:

$$(1-X_i)^2 A_{ii} + (1-X_i)X_j A_{ij} + X_j^2 A_{jj} = 0 \quad (24)$$

$i=G, j=B$ or $i=B, j=G$
where $$A_{ij} = \delta_i'\delta_j' - (\delta_i\delta_j'' + \delta_j\delta_i'')/2 - 2V\delta_i\delta_j \\ V(\delta_i'\delta_j + \delta_j\delta_i')/2. \quad (25)$$

In writing Eq. (24), small correction terms of order $X^3$ have been neglected.

The quantities $A_{GG}$, $A_{BG}$, $A_{BB}$ of eq. (25) can be evaluated using the aforementioned Sellmeier fits to refractive index data.

Equations (24) thus represent a pair of simultaneous quadratic equations which determine the design parameters $X_G$ and $X_B$. The solutions of eq. (24) are $$X_G = \pm [2A_{BB} + A_{BG} \pm D]/(2D) \quad (26a)$$

$$X_B = \pm [2A_{GG} + A_{BG} \pm D]/(2D) \quad (26b)$$

where $$D = (A^2_{BG} - 4 A_{BB}A_{GG})^{\frac{1}{2}}. \quad (27)$$

Using the aforementioned Sellmeier fits and choosing $\lambda = 0.85$ microns, one can use these equations to find the solution:

$$X_G = 0.772 \text{ and } X_B = 1.082. \quad (28)$$

Equations (21) and (22) can then be used to find $$\Delta_1 = 9.04 \times 10^{-3} \text{ and } \Delta_2 = 0.62 \times 10^{-3} \quad (29a)$$

$$\frac{\lambda d\Delta_1}{d\lambda} = 7.60 \times 10^{-4} \text{ and } \frac{\lambda d\Delta_2}{d\lambda} = -6.61 \times 10^{-4}. \quad (29b)$$

Equation (2) then gives the desired result:

$$\alpha_1 = 1.810 \text{ and } \alpha_2 = 4.088. \quad (30)$$

The index profile characterized by Equations (29) and (30) can be produced if the germania and boron oxide dopant concentration profiles are:

$$C_G(r) = 0.079[1. - 0.772(r/a)^{1.810} - 0.228(r/a)^{4.088}] \quad (31a)$$

and $$C_B(r) = 0.135 \, [2.082(r/a)^{1.810} - 1.082(r/a)^{4.088}]. \quad (31b)$$

These results are based on the assumption that the refractive index varies linearly with dopant concentration. For glass-forming systems exhibiting departures from linearity, this invention can still be applied by extending the analysis to include the non-linear terms.

Figure 3:
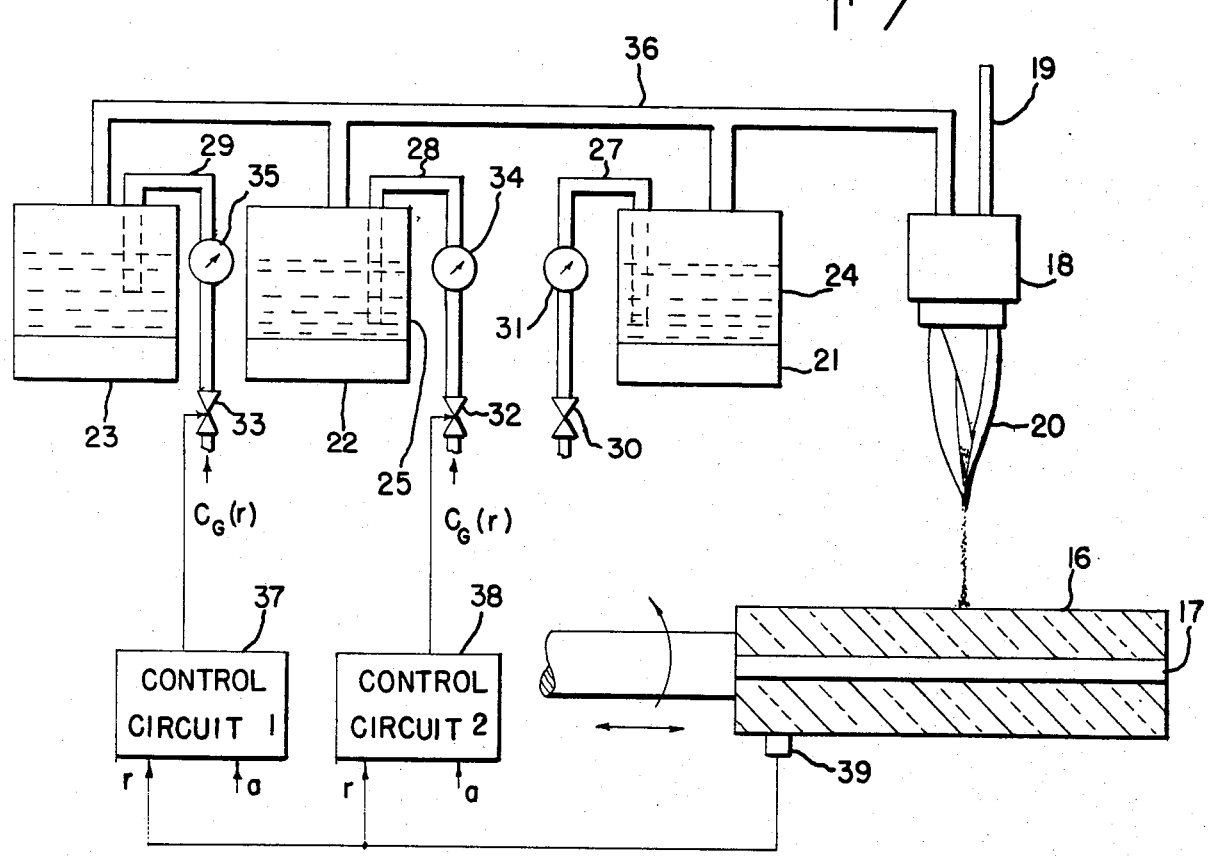
FIG. 3 depicts a method of fabricating the waveguide.

FIG. 3 depicts apparatus for forming a waveguide having the profiles of equations (30) and (31). The apparatus will be described first so that the manner in which the present invention is used to operate this apparatus can be better understood.

A layer 16 of glass soot is applied to a substantially cylindrical glass starting member or bait rod 17 by means of outside vapor phase oxidation burner 18. Fuel gas and oxygen or air are supplied to burner 18 from a source not shown by a suitable means such as pipe 19. This mixture is burned to produce flame 20 which is emitted from the burner.

Containers 21, 22 and 23 hold quantities of liquid constituents 24, 25 and 26 respectively which will ultimately form layer 16. A suitable gaseous medium, such as oxygen or the like, is supplied to the containers and bubbled through the liquids by means of tubes 27, 28 and 29. The gaseous medium or carrier gas is supplied from a suitable source, not shown, in predetermined quantities and at predetermined pressures. The flow of carrier gas which is bubbled through liquid constituent 24 in container 21 is regulated by valve 30, the flow rate of this carrier gas being indicated by gauge 31. Similarly, the flows of carrier gas bubbled through liquid constituents 25 and 26 in containers 22 and 23 are regulated by valves 32 and 33 with the flow rates of these gases being indicated by gauges 34 and 35.

The liquid constituents in the containers are maintained at the desired temperatures by heaters. As the carrier gas is bubbled through the heated liquid constituents, vapors of this liquid become entrained in the carrier gas and are exhausted by means of tube or pipe 36. The carrier gas vapor mixture is fed to outside vapor phase oxidation burner 18 and is injected into flame 20 wherein the gas vapor mixture is oxidized to form a glass soot. The soot leaves flame 20 in a stream which is directed toward starting member 17. Starting member 17 is both rotated and translated as indicated by the arrows adjacent the supporting end of the starting member so that a uniform deposition of soot is applied to the starting member.

Containers 21–23 contain a glass forming reactants and at least two dopants. In this example, container 21 contains $SiCl_4$, container 25 contains $GeCl_4$ and container 26 contains $BCl_3$.

The valves 30–32 are controlled in the manner described in the Schultz U.S. Pat. No. 3,826,560 to produce the gradient index of refraction. Valves 32 and 33 are controlled in accordance with this invention to vary the dopant concentration in the desired manner.

In accordance with the invention, control circuits 37 and 38 control the concentrations of the two dopants while the waveguide preform is being formed. A sensor 39 produces an electrical output representing the radius of the waveguide preform as it is being formed. This signal is applied to each of the control circuits 37 and 38. Control circuit 37 produces a control signal which varies in accordance with equation (31). In this example, the concentration of $GeO_2$ is assumed to be 7.9 mole percent at the center of the core and the concentration of $B_2O_3$ is 13.5 mole percent at the cladding. Therefore, control circuits 37 and 38 are programmed to produce dopant concentration profiles in the preform which will yield concentration profiles in the waveguide given by Equation (31).

Analog circuits which produce such control signals are well known. For example, "ANALOG COMPUTATION IN ENGINEERING DESIGN," Rogers and Connolly, McGraw-Hill Book Company, Inc., 1960, describes such circuits. However, in the preferred embodiment of the invention, a digital microprocessor is used to generate the control signals. One example of a microprocessor which is suitable for this purpose is the Program Logic Controller, manufactured by Allen-Bradley Company.

For the optical waveguide made in this manner, the pulse dispersion versus wavelength has been calculated and is shown by C2 in FIG. (4). By comparing C2 of the present invention to C1 for a single $\alpha$ profile, it can be seen that curve C2 minimizes pulse dispersion over a significantly broader range of wavelengths.

Figure 5:
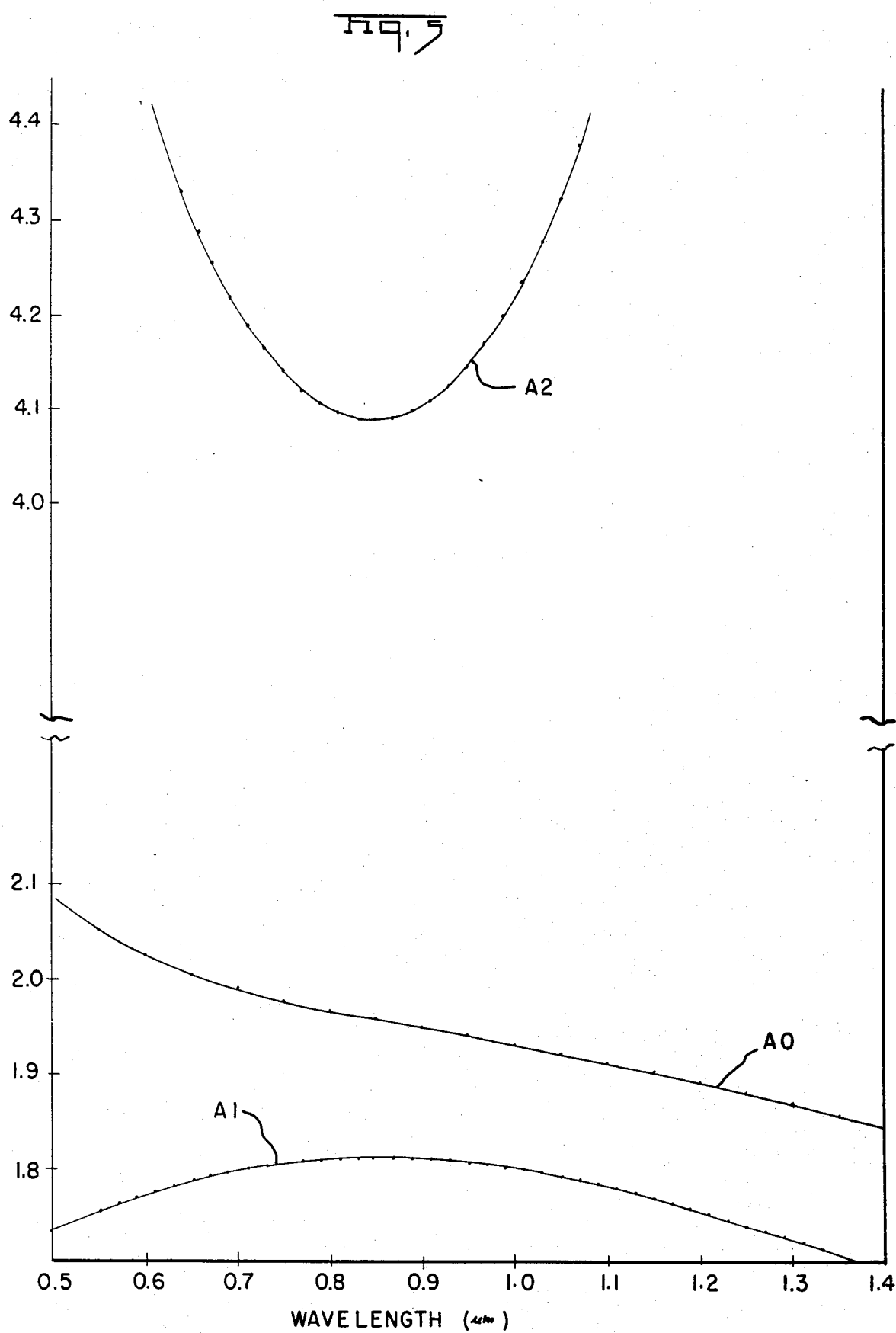
FIG. 5 shows the curve A0 which shows how the optimal $\alpha$ changes as a function of $\lambda$ for the single $\alpha$ profile; curves A1 and A2 show $\alpha_1(\lambda)$ and $\alpha_2(\lambda)$ for a preferred embodiment of the invention; both A1 and A2 have zero slope at 0.85 $\mu$m.
Figure 6:
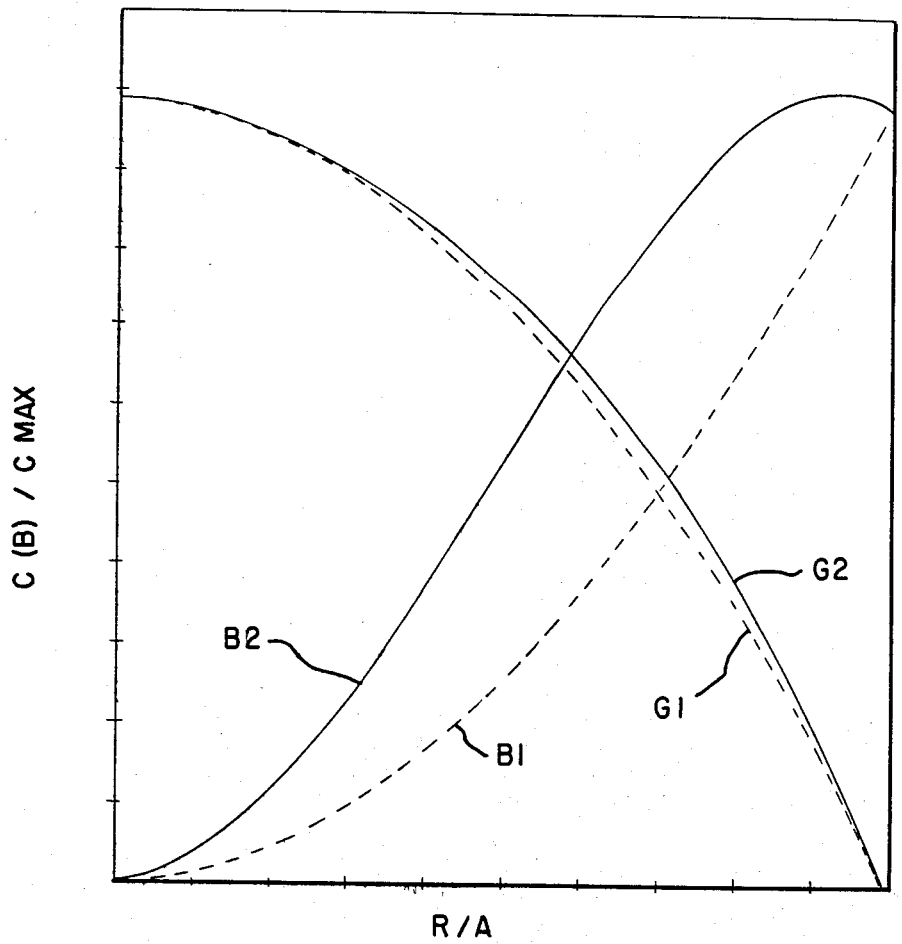
FIG. 6 shows curves B1 and G1 which show the $B_2O_3$ and $GeO_2$ concentration profiles for the single $\alpha$ profile designed for minimum dispersion at 0.85 $\mu$m; curves B2 and G2 show $B_2O_3$ and $GeO_2$ concentrations profile for a preferred embodiment of the double $\alpha$ profile designed for $d\alpha_i/d\lambda=0$ at 0.85 $\mu$m.

In FIG. 5, $\alpha_1(\lambda)$ and $\alpha_2(\lambda)$ are the functions of Eq. (2) which have been determined in Example 2. It can be seen that both $\alpha_1$ and $\alpha_2$ have zero slope at 0.85 microns in accordance with the condition of equation (14). It is because of the zero slope in $\alpha_1(\lambda)$ and $\alpha_2(\lambda)$ at 0.85 microns that the pulse dispersion versus wavelength has a very broad region of minimum pulse dispersion.

In FIG. (6), the $GeO_2$ and $B_2O_3$ dopant profiles of this example are shpwn by curves G2 and B2. For comparison, the $GeO_2$ and $B_2O_3$ dopant profiles required to produce the optimal single $\alpha$ profile of the prior art are shown by curves G1 and B1. The prior art concentration profiles shown by G1 and B1 are given as $$C_G(r) = 0.079[1-(r/a)^{1.957}] \tag{32}$$

$$C_B(r) = 0.135(r/a)^{1.957}. \tag{33}$$

It is clear that the dopant profile of the optimal single $\alpha$ profile and the double $\alpha$ profile of this example are different. These differences can be observed by using an X-ray microprobe technique to measure dopant profiles of optical waveguides or of optical waveguides preforms. Such a microprobe technique has been described by W. T. Kane in an article entitled, "APPLICATIONS OF THE ELECTRON MICROPROBE IN CERAMICS AND GLASS TECHNOLOGY" which appears in *Microprobe Analysis* edited by C. A. Andersen, John Wiley & Sons, Inc. 1973.

EXAMPLE 3

As another illustration of a preferred embodiment of the invention, index profiles will be determined which provide minimum pulse dispersion at two wavelengths, $\lambda_1 = 0.80$ microns and $\lambda_2 = 1.20$ microns.

Let the symbols defined in equations (16)-(22) represent quantities at 0.80 microns. Define an analogous set of quantities evaluated at 1.20 microns and denote these quantities by writing a bar over the symbol. For example $$\bar{\delta}_G = \bar{n}_c^2 - \bar{n}_s^2 \tag{34}$$

where $\bar{n}_C$ and $\bar{n}_S$ are evaluated at 1.20 microns. The condition to be satisfied is that $$\alpha_1 = \bar{\alpha}_1$$

$$\alpha_2 = \bar{\alpha}_2. \tag{35}$$

By using equation (4) and the definitions of equations (16)-(22) it follows that equation (35) is equivalent to the expression:

$$(1-X_i)^2 B_{ii} + (1-X_i)X_j B_{ij} + X_j^2 B_{jj} = 0 \tag{36}$$

where $i = G$ and $j = B$ or $j = G$ and $i = B$. In writing Eq. (36), small correction terms of order $X^3$ have been neglected. The quantities $B_{ij}$ are defined as $$B_{ij} = 2(Z-\bar{Z})(\delta_j\bar{\delta}_j+\delta_j\bar{\delta}_i)+(2-\bar{Z})(\bar{\delta}_i\delta_j'+\bar{\delta}_j\delta_i')-(2-Z)(\delta_i\bar{\delta}_j'+\delta_j\bar{\delta}_i') \tag{37}$$

The coefficients $B_{GG}$, $B_{BB}$, $B_{GB}$ can be evaluated from the aforementioned Sellmeier fits.

Equation (36) can then be solved to find $$X_G = 0.398$$

$$X_B = -2.021 \tag{38}$$

and $$\alpha_1 = 3.028$$

$$\alpha_2 = 1.581. \tag{39}$$

Pulse dispersion versus wavelength for a waveguide fabricated according to the above specifications is shown in FIG. 7. The pulse dispersion is minimized in the vicinity of 0.80 μm and 1.20 μm.

The dopant profiles of this waveguide are given as $$C_G(R) = 0.079[1-0.398(r/a)^{3.028}-0.602(r/a)^{1.581}]$$

$$C_B(R) = 0.135[3.021(r/a)^{1.581}-2.021(r/a)^{3.028}]. \tag{40}$$

If the linear approximation of equation (21) is not valid, the analysis becomes more difficult; but the principles of waveguide design remain the same.

Further improvement in reducing pulse dispersion can be achieved by introducing additional design parameters $\epsilon_i$ into equation (13) so that $$\alpha_i = 2 - 2\frac{n_c}{N_c}\frac{\lambda}{\Delta_i}\frac{d\Delta_i}{d\lambda} - \frac{12}{5}\Delta\epsilon_i. \tag{41}$$

The $\epsilon_i$ are considered to be small parameters, that is $$|\epsilon_i| \leq 2. \ i=1 \ldots N. \tag{42}$$

Using standard methods of analysis $\epsilon_i$ can be chosen which further reduce dispersion. The exact values of $\epsilon_i$ depend on $\Delta_j$, $(d\Delta_j/d\lambda)$, $\lambda$, $n_c$, $N_c$ and the distribution of optical power among the mode of the waveguide.

Any particular choice of $\epsilon_i$ subject to the condition of equation (42) is within the scope of this invention.

While a particular embodiment of the invention has been shown and described, various modifications are within the true spirit and scope of the invention. The appended claims are intended to cover all such modifications.

What is claimed is:

1. An optical waveguide comprising at least three glass-forming compounds and having a core with a radially-graded refractive index profile and a cladding, said refractive index profile changing as a function of radius r substantially as:

$$n^2(r) = n_c^2 \left[ 1 - \sum_{(i=1)}^{N} 2\Delta_i(r/a)^{\alpha_i} \right]$$

where
$N \geq 2$ is the number of $\alpha$-type index profile terms
$n_c$ is the refractive index at $r=o$
$n_o$ is the refractive index at $r=a$
$\Delta = (n_c^2 - n_o^2)/2n_c^2$ $$\Delta = \sum_{i=1}^{N} \Delta_i$$

and $\Delta_i$ and $\alpha_i$ are values which produce reduced pulse dispersion.

2. The optical waveguide recited in claim 1 wherein the values $\alpha_i$ are given by:

$$\alpha_i = 2 - \frac{2n_c}{N_c} \frac{\lambda}{\Delta_i} \frac{d\Delta_i}{d\lambda} - \frac{12\Delta}{5}, i = 1, \ldots, N.$$

where $\lambda$ is a wavelength at which said waveguide will be used and $$N_c = n_c - \frac{\lambda dn_c}{d\lambda}.$$

3. The optical waveguide recited in claim 1 wherein the values of $\alpha_i$ are given by:

$$\alpha_i = 2 - \frac{2n_c}{N_c} \frac{\lambda}{\Delta_i} \frac{d\Delta_i}{d\lambda} - \frac{12}{5} \epsilon_i \Delta$$

where $\lambda$ is a wavelength at which said waveguide will be used, $$N_c = n_c - \lambda \frac{dnc}{d\lambda}$$

$$|\epsilon_i| \leq 2 \qquad i = 1, \ldots, N$$

and where the $\epsilon_i$ produce improved pulse dispersion.

4. The optical waveguide recited in claim 3 wherein $\Delta_i$ are values which produce reduced pulse dispersion over a range of wavelengths.

5. The optical waveguide recited in claim 3 wherein $\Delta_i$ are values which produce reduced pulse dispersion at two or more wavelengths.

6. The optical waveguide recited in claim 4 wherein $\Delta_i$ are values such that:

$$\left.\frac{d\alpha_i}{d\lambda}\right|_{\lambda = \lambda_o} = 0, \qquad i = 1, \ldots N$$

where $\lambda_o$ is a wavelength in the spectral range at which said waveguide will be used.

7. The optical waveguide recited in claim 6 wherein $\epsilon_i = 1$ for $i = 1 \ldots N$.

8. The optical waveguide recited in claim 3 wherein the values of $\Delta_i$ are such that $$\alpha_i(\lambda_1) = \alpha_i(\lambda_2) \ldots = \alpha_i(\lambda_q), \quad i = 1 \ldots N \text{ where}$$
$$2 \leq q \leq N$$

where $\lambda_1, \lambda_2 \ldots \lambda_q$ include at least one wavelength at which said waveguide will be used.

9. The optical waveguide recited in claim 9 wherein $\epsilon_i = 1$ for $i = 1 \ldots N$.

10. An optical waveguide comprising p glass forming compounds where $p \leq 3$ and having a core with a radially-graded composition profile and a cladding, said concentration profile $C_j(r)$ of the glass forming compounds varying substantially as:

$$C_j(r) = C_j(o) + \sum_{i=1}^{N} C_{ji}(r/a)^{\alpha_i}$$
$$j = 1, \ldots, p$$
$$i = 1, \ldots, N$$
$$N \geq 2,$$

where the coefficients $C_{ji}$ and $\alpha_i$ produce reduced pulse dispersion, and where $C_j(o)$ denote the concentrations at the radius $r = o$.

11. In an optical communication system comprising:
a source producing pulses of light having a mean wavelength $\lambda$,
a multimode optical waveguide having input and output ends, said input end being disposed in light receiving relationship with respect to said source, and
means responsive to light radiating from the output end of said waveguide, said optical waveguide comprising:
a transparent core having a radius including at least three glass-forming compounds having a refractive index $n_c$ at the center of said core,
a layer of cladding material surrounding said core, the refractive index of said layer being less than the refractive index of said core, the improvement wherein the refractive index $n(r)$ of said core varies as a function of the radial distance r from the center of said core substantially as:

$$n^2(r) = n_c^2 [1 - \sum_{i=1}^{N} 2\Delta_i(r/a)^{\alpha_i}]$$

where $\alpha_i$ are values which produce minimum pulse dispersion in said waveguide and which are related to the properties of said glass forming compounds such that:

$$\alpha_i = 2 - \frac{2n_c}{N_c} \frac{\lambda}{\Delta_i} \frac{d\Delta_i}{d\lambda} - \frac{12\Delta}{5} \quad i = 1, \ldots N \text{ where } N \geq 2,$$

$n_c$ is the refractive index at the center of said core,
$n_0$ is the refractive index at $r = a$,
$N_c = n_c - \lambda dn_c/d\lambda$ and $$\Delta = \sum_{i=1}^{N} \Delta 1 = (n_c^2 - n_o^2)/2n_c^2.$$

* * * * *

UNITED STATES PATENT AND TRADEMARK OFFICE
CERTIFICATE OF CORRECTION

PATENT NO. : 4,222,631
DATED : September 16, 1980
INVENTOR(S) : Robert Olshansky It is certified that error appears in the above-identified patent and that said Letters Patent are hereby corrected as shown below:

Column 6, line 42, "$-5^{12}\Delta$" should be -- $-\frac{12}{5}\Delta$ --.

Column 7, line 49, "$\beta_1$" should be -- $\alpha_1$ --.

Column 11, line 39, "shpwn" should be -- shown --.

Column 14, line 12, "claim 9" should be -- claim 8 --.

Column 14, line 15, "$p \leq 3$" should be -- $p \geq 3$ --.

Column 14, line 52, after "where" add -- and $\Delta_i$ --.

Signed and Sealed this

Twenty-eighth Day of April 1981

[SEAL]

Attest:

RENE D. TEGTMEYER

Attesting Officer

Acting Commissioner of Patents and Trademarks